(12) United States Patent
Abe et al.

(10) Patent No.: US 11,073,923 B2
(45) Date of Patent: Jul. 27, 2021

(54) INPUT DEVICE

(71) Applicants: PIONEER CORPORATION, Tokyo (JP); Tohoku Pioneer Corporation, Yamagata (JP)

(72) Inventors: Makoto Abe, Yamagata (JP); Takeru Miki, Yamagata (JP); Atsushi Kudo, Yamagata (JP); Masakazu Takahashi, Yamagata (JP)

(73) Assignees: PIONEER CORPORATION, Tokyo (JP); TOHOKU PIONEER CORPORATION, Yamagata (JP)

(*) Notice: Subject to any disclaimer, the term of this patent is extended or adjusted under 35 U.S.C. 154(b) by 416 days.

(21) Appl. No.: 15/753,636

(22) PCT Filed: Aug. 12, 2016

(86) PCT No.: PCT/JP2016/073790
§ 371 (c)(1),
(2) Date: Feb. 20, 2018

(87) PCT Pub. No.: WO2017/030097
PCT Pub. Date: Feb. 23, 2017

(65) Prior Publication Data
US 2020/0209994 A1    Jul. 2, 2020

(30) Foreign Application Priority Data
Aug. 19, 2015 (JP) .............................. JP2015-161857

(51) Int. Cl.
*G06F 3/041* (2006.01)
(52) U.S. Cl.
CPC ................... *G06F 3/041* (2013.01)

(58) Field of Classification Search
CPC ...................................................... G06F 3/041
See application file for complete search history.

(56) References Cited

U.S. PATENT DOCUMENTS 7,307,619 B2* 12/2007 Cunningham .......... G06F 3/016
345/158
2012/0133586 A1* 5/2012 Nishimura ............ G06F 3/0354
345/158
(Continued)

FOREIGN PATENT DOCUMENTS

JP    49-25478    3/1974
JP    2008-278376    11/2008
(Continued)

OTHER PUBLICATIONS

International Search Report, PCT/JP2016/073790, dated Oct. 11, 2016.

*Primary Examiner* — Towfiq Elahi
(74) *Attorney, Agent, or Firm* — Nixon & Vanderhye

(57) ABSTRACT

The disclosed apparatus reduces necessary electric power for moving a touch pad of an input device to a predetermined height and maintaining the touch pad at the height, the touch panel creating a sense of touch when operated. The input device includes: a contact member to be in contact with a contact body; a housing for supporting the contact member in a movable manner; and a drive device for moving the contact member with respect to the housing, wherein the drive device is equipped with a rotatable rotary body, first magnets disposed on the rotary body, and second magnets disposed on the contact member, and wherein the first magnets and the second magnets are arranged so as to be able to face each other.

16 Claims, 12 Drawing Sheets

(56) References Cited

U.S. PATENT DOCUMENTS

2015/0153179 A1    6/2015    Bolzmacher et al.
2016/0179200 A1*    6/2016    Billington ............... G06F 3/041
                                                                            345/173

FOREIGN PATENT DOCUMENTS

JP         2011-145724      7/2011
JP         2013-065140      4/2013

\* cited by examiner

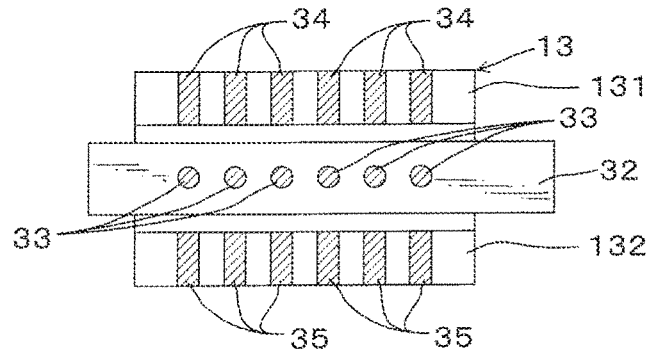
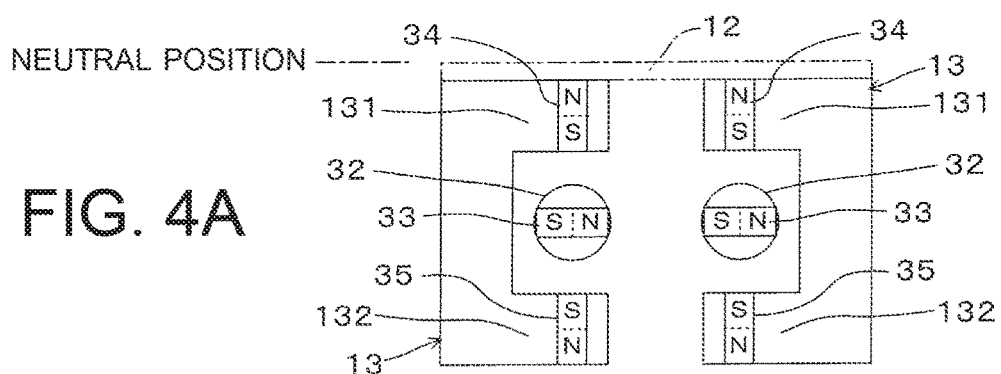
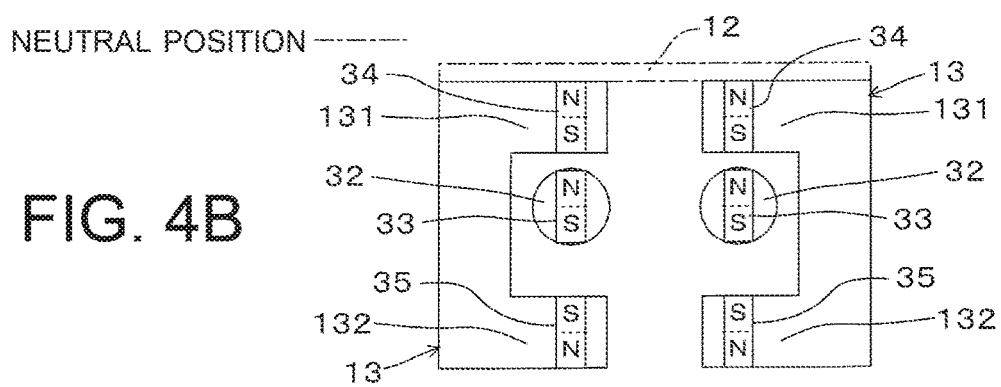
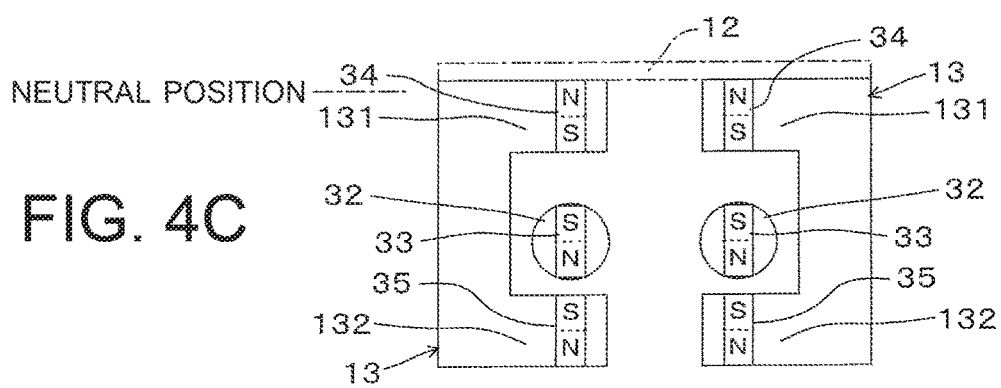

INPUT DEVICE

TECHNICAL FIELD

This invention relates to an input device.

BACKGROUND ART

Conventionally, in various electronics devices, there is a device in which a touch face of a touch pad is operated for an input operation by a user to the electronic device. Further, as such a device disclosed in JP 2008-278376 A (Patent Literature 1), there is one in which a voice coil or a magnet is arranged below the touch pad for providing a sense of touch to a finger or the like operating the touch face.

Patent Literature 1 relate to an input device having a sense of touch and an electronic device for providing a sense of touch when select an icon from a display screen for selecting an input item and input data. In the input device, coils attached to a vibration plate are arranged movably, and when a low frequency signal for providing a sense of touch is inputted to the coil, the vibration plate is vibrated.

CITATION LIST

Patent Literature

Patent Literature 1: JP 2008-278376 A

SUMMARY OF INVENTION

Technical Problem

In the conventional input device, it is necessary to apply electric current to the coil in a certain period for maintaining the vibration plate in a specific height, and a large electric energy is consumed.

Accordingly, an object of the present invention is, for example, to provide an input device able to hold a touch pad in a specific position with low electric power.

Solution to Problem

There is provided an input device according to a first aspect of the present invention including:
  a contact member to be in contact with a contact body;
  a housing for supporting the contact member in a movable manner; and
  a drive device for moving the contact member with respect to the housing to change a height of a contact face of the contact member with respect to the housing,
  wherein the drive device is equipped with a rotatable rotary body, one or a plurality of first magnets disposed on the rotary body, and one or a plurality of second magnets disposed on the contact member, and
  wherein the first magnet and the second magnet are arranged so as to be able to face each other.

There is provided a movable body according to a second aspect of the present invention including:
  the input device described above;
  a controller; and
  a display,
  wherein the display is provided at a position different from a position of the input device.

BRIEF DESCRIPTION OF DRAWINGS

FIG. 3 is a schematic view of a movable magnet and a shaft magnet of the input device according to the first embodiment.

FIGS. 4A to 4C are operation explanatory views of the input device according to the first embodiment.

DESCRIPTION OF EMBODIMENTS

Figure 1:
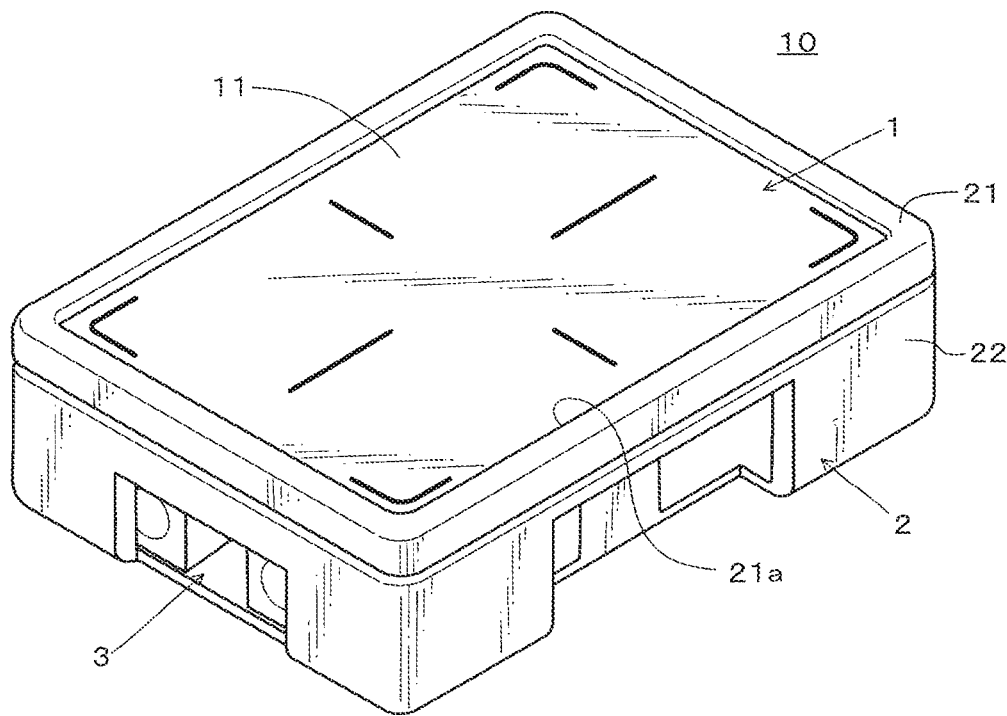
FIG. 1 is an external perspective view of an input device according to a first embodiment of the present invention.

Hereinafter, an embodiment of the present invention will be explained. An input device according to an embodiment of the present invention includes: a contact member to be in contact with a contact body; a housing for supporting the contact member in a movable manner; and a drive device for moving the contact member with respect to the housing to change a height of a contact face of the contact member with respect to the housing, wherein the drive device is equipped with a rotatable rotary body, one or a plurality of first magnets disposed on the rotary body, and one or a plurality of second magnets disposed on the contact member, and wherein the first magnet and the second magnet are arranged so as to be able to face each other.

Further, this input device is characterized in that due to a rotation of the rotary body, a position of the first magnet with respect to the second magnet is changed.

Further, this input device is characterized in that the rotary body is a shaft arranged opposite to the contact member, and that the first magnet is provided on a side face around a rotating axis of the shaft. Therefore, by controlling a rotational position of the shaft, a vertical position of the contact member can be controlled.

Further, this input device is characterized in that the rotary body is a rotary plate arranged opposite to the contact member, and that the first magnet is provided at a position away from a rotating axis of the rotary plate in a specific distance. Namely, the first magnet is provided on a circumference about the rotating axis of the rotary plate. Therefore, by controlling a rotational position of the shaft, a vertical position of the contact member can be controlled.

Further, this input device is characterized in that the plurality of first magnets is arranged along the rotating axis of the shaft, and that the plurality of second magnets is arranged so as to be able to face the first magnets. Therefore, magnetic forces of the plurality of magnets cooperate to obtain strong driving force.

Further, this input device is characterized in that the plurality of first magnets is provided on the rotary plate, and that the plurality of second magnets is arranged on a face of the contact member opposite to the first magnets. Therefore, magnetic forces of the plurality of magnets cooperate to obtain strong driving force.

Further, this input device is characterized in that the plurality of first magnets provided on the rotary plate is arranged at regular intervals in a circumferential direction of the rotary plate. Because the first magnets are arranged at regular intervals on the same circumferential about the rotating axis of the rotary plate, the rotational position of the rotary plate is controlled as a rotational angle at regular intervals, and thereby a processing becomes easy.

Further, this input device is characterized in that the plurality of first magnets is arranged at an outer periphery side than the center of the contact member. Because the plurality of magnets is arranged at the outer periphery side than the center of the contact member (operational input section), the magnet forces act on the outer periphery so that an operation of the contact member becomes stable.

Further, this input device is characterized in that magnetic poles of the first magnet and the second magnet facing each other are different from each other. Because a pair of magnets of the first magnets and the second magnets facing each other has different magnetic poles, the contact member can be driven by adsorbing magnetic forces.

Further, this input device is characterized in that the contact member is supported by the housing via an elastic member. The contact member can be held at the neutral position by the elastic member provided on the housing, and the contact member (operational input section) can be held at the neutral position with a simple structure.

Further, this input device is characterized in that the drive device includes a motor for rotating the rotary body, and has a sensor for measuring the number of rotations of the motor, or a sensor for measuring the number of rotations of the rotary body. The drive device may have both of these sensors. Owing to the sensor for measuring the number of rotations of the motor, or the sensor for measuring the number of rotations of the rotary body, a precise positional control can be carried out.

Further, there is provided a movable body including: the input device described above; a controller; and a display, wherein the display is provided at a position different from a position of the input device.

EMBODIMENTS

The input device according to this embodiment will be explained with reference to FIGS. 1 to 21.

First Embodiment

Figure 2:
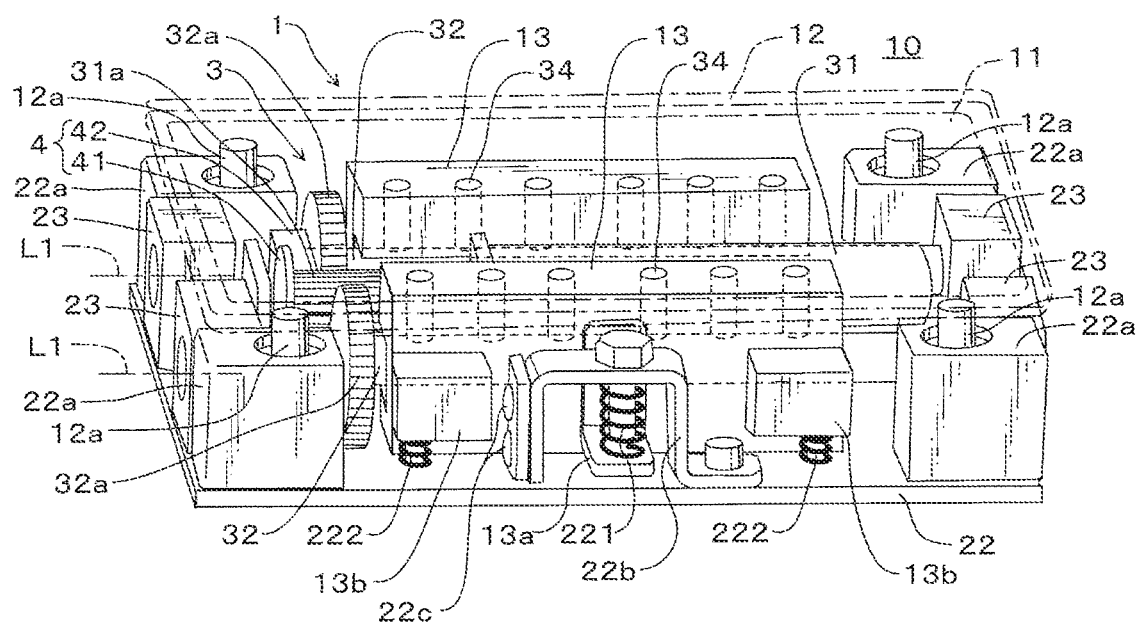
FIG. 2 is a perspective view of a main part of the input device according to the first embodiment showing a state that a housing of the input device is removed.

FIG. 1 is an external perspective view of an input device according to a first embodiment of the present invention, FIG. 2 is a perspective view of a main part of the input device according to the first embodiment showing a state that a housing of the input device is removed, FIG. 3 is a schematic view of a movable magnet and a shaft magnet of the input device according to the first embodiment, and FIG. 4 is an operation explanatory view of the input device according to the first embodiment. This input device is, for example, connected to a car navigation system of a vehicle, and provided on, for example, a center console between a driver seat and a front passenger seat, a steering, a door trim, or the like. Here, the vehicle is an example of a movable body, the car navigation is an example of an electronic device mounted on the movable body, and the center console, the steering, and the door trim are examples of members composing the movable body.

As shown in FIGS. 1 and 2, an input device 10 of the first embodiment includes: an operational input section 1 as an example of "a contact member" to be in contact with a contact body such as a finger of a user or a pointing pen; a housing 2 for supporting the operational input section 1 in a movable manner; and a drive device 3 for moving the operational input section 1 with respect to the housing 2 to change a height of a contact face of the operational input section 1 with respect to the housing 2.

The operational input section 1 includes: a touch pad 11; a tactile pad base 12 for fixing the touch pad 11; and two movable blocks 13 having C-shaped sectional shapes attached along two sides opposite to each other on a rear face of the tactile pad base 12. Here, a rectangular surface of the touch pad 11 is "a contact face" to be in contact with the contact body. Further, a surface of the tactile pad base 12 is a face on which the touch pad 11 is arranged, and a rear face of the tactile pad base 12 is a face to the driving device 3 side. Further, a height of the contact face of the operational input section 1 with respect to the housing 2 means a position (displacement) in a direction crossing the surface of the touch pad 11 (for example, orthogonal direction).

The housing 2 shown in FIG. 1 includes: an upper case 21 (refer to FIG. 1) having an opening 21a for arranging the touch pad 11; and a lower case 22 for receiving the operational input section 1 and the driving device 3. Four corners of the tactile pad base 12 are provided with rods 12a extending from a rear face of the tactile pad base 12. Four corners in the lower case 22 are provided with thrust bearings 22a for bearing the rods 12a slidably in a thrust direction.

Further, two pairs of first springs 221 and two pairs of second springs 222 are provided in the lower case 22. The first spring 221 is arranged in between a C-shaped flame 22b fixed to the lower case 22 and an L-shaped flame 13a fixed to a side face of the movable block 13. Further, the second spring 222 is arranged in between the lower case 22 and a boss section 13b of the movable block 13. Then, the first spring 221 biases the movable block 13 (operational input section 1) downward, and the second spring 222 biases the movable block 13 (operational input section 1) upward. Thereby, the first and second springs 221, 222 support the operational input section 1 elastically and movably, and the operational input section 1 is held in a neutral position where the operational input section 1 do not receive an effect of magnetic force of a later-described driving device 3. The spring forces of the first and second springs 221, 222 are set smaller than the magnetic force, and larger than a weight of the operational input section 1. Thereby, the neutral position of the movable block 13 (operational input section 1) is maintained. In this way, the first spring 221 controls an upward movement of the movable block 13, and the second spring 222 controls a downward movement of the movable block 13.

The driving device 3 includes: a motor 31; two shafts 32 as an example of rotatable "rotary body" rotated around a rotating axis L1 by the motor 31; a plurality of magnets 33 of which magnetic poles are arranged on a side face of the shaft 32 along the rotating axis L1; a plurality of magnets 34 provided on an upper block 131 of the movable block 13; and a plurality of magnets 35 provided on a lower block 132 of the movable block 13 as shown in FIG. 3. These magnets 33, 34, and 35 are permanent magnets. The magnets 33 are "first magnets" provided on the shaft 32 side. Further, magnets 34 and 35 are "second magnets" provided on the movable block 13 side. The shaft 32 is interposed between the upper block 131 and the lower block 132 of the movable block 13. Thereby, the shaft 32 is opposite to the operational input section 1 (including the movable block 13) as the contact member. Incidentally, the shaft 32 and the magnets 33 shown in FIG. 3 are in a later-described neutral position.

As shown in FIG. 2, two shafts 32 are respectively supported by four bearings 23 provided on the lower case 22. A spur gear 32a is attached to one side of each of two shafts 32. Further, a pinion 31a provided in between two spur gears 32a to mesh with the two spur gears 32a and a slit plate 41 of a rotary encoder 4 are attached to a driving shaft of the motor 31.

Then, owing to the driving of the motor 31, a torque of the motor 31 is transmitted to the shaft 32 via the pinion 31a and the spur gears 32a, and the two shafts 32 are respectively rotated in the same direction about the rotating axis L1. Further, the rotary encoder 4 is composed of the slit plate 41 and a photo sensor 42, and a rotational amount (number of rotations) from an initial position of the motor 31 (a position before the motor 31 is driven) is detected by an output signal of this photo sensor 42. Owing to the rotational amount from the initial position of the motor 31, a rotational angle from a specific initial position of the shaft 32 (a position before the shaft 32 is rotated) is detected.

Further, the flame 22b of the lower case 22 is provided with a photo sensor 22c for sensing the boss section 13b of the movable block 13. A vertical position of the operational input section 1 (movable block 13) is measured by this photo sensor 22c. As described above specifically, the vertical position means a height of the contact face of the operational input section 1 with respect to the lower case 22 of the housing 2. Namely, for preventing a false operation, an operation of the shaft 32 of the driving device 3 is started when the operational input section 1 is pushed into a specific height (a position at the housing 2 side with respect to the neutral position of the tactile pad base 12, and a position near the housing 2 in a specific distance from the neutral position).

FIGS. 4A to 4C are schematic views showing relationships among the rotational position of the shaft 32, the vertical position of the operational input section 1, and the magnetic poles of the magnets 33, 34, and 35. FIG. 4A shows a case that the operational input section 1 is in the neutral position. FIG. 4B shows a case that the operational input section 1 is moved downward. FIG. 4C shows a case that the operational input section 1 is moved upward. Here, as shown in FIGS. 4A to 4C, magnetic poles of the magnet 34 at the upper block 131 side and the magnet 35 at the lower block 132 side are in opposite directions. Seeing from a top view, the magnets 34 and 35 are overlapped with each other via the shaft 32. Incidentally, in the magnets 33, 34, and 35, it goes without saying that N pole and S pole are adsorbed each other, and a couple of N poses or a couple of S poles are repulsive each other.

As shown in FIG. 4A, when the shaft 32 is stopped at a position where a magnetic field direction of the magnet 33 (a direction of magnetic moment) is perpendicular to magnetic field directions of the magnets 34 and 35, the magnetic force generated by the magnets 33 and 34 becomes the same as the magnetic force generated by the magnets 33 and 35, and the operational input section 1 turns to the neutral position. As shown in FIG. 4B, when the shaft 32 is rotated to a position where N pole of the magnet 33 faces S pole of the magnet 34, and S pole of the magnet 33 faces S pole of the magnet 35, the magnet 33 absorbs the magnet 34, and the magnet 33 repels against the magnet 35, and thereby the operational input section 1 can be moved downward from the neutral position. As shown in FIG. 4C, when the shaft 32 is rotated to a position where N pole of the magnet 33 faces S pole of the magnet 35, and S pole of the magnet 33 faces S pole of the magnet 34, the magnet 33 absorbs the magnet 35, and the magnet 33 repels against the magnet 34, and thereby the operational input section 1 can be moved upward from the neutral position. As described above, the magnets 33 and the magnets 34 or 35 are arranged to be able to face each other owing to a rotation of the shaft 32 by the driving device 3.

In this way, because the rotational angle of the shaft 32 can be set at the specific position by measuring the number of rotations (rotational amount) of the motor 31 with the rotary encoder 4, the shaft 32 can be rotated to the specific position with the motor 31, and thereby the tactile pad base 12 can be moved in a vertical direction from the neutral position using the absorption force and the repelling force of the magnets 33, 34, and 35.

Figure 5:
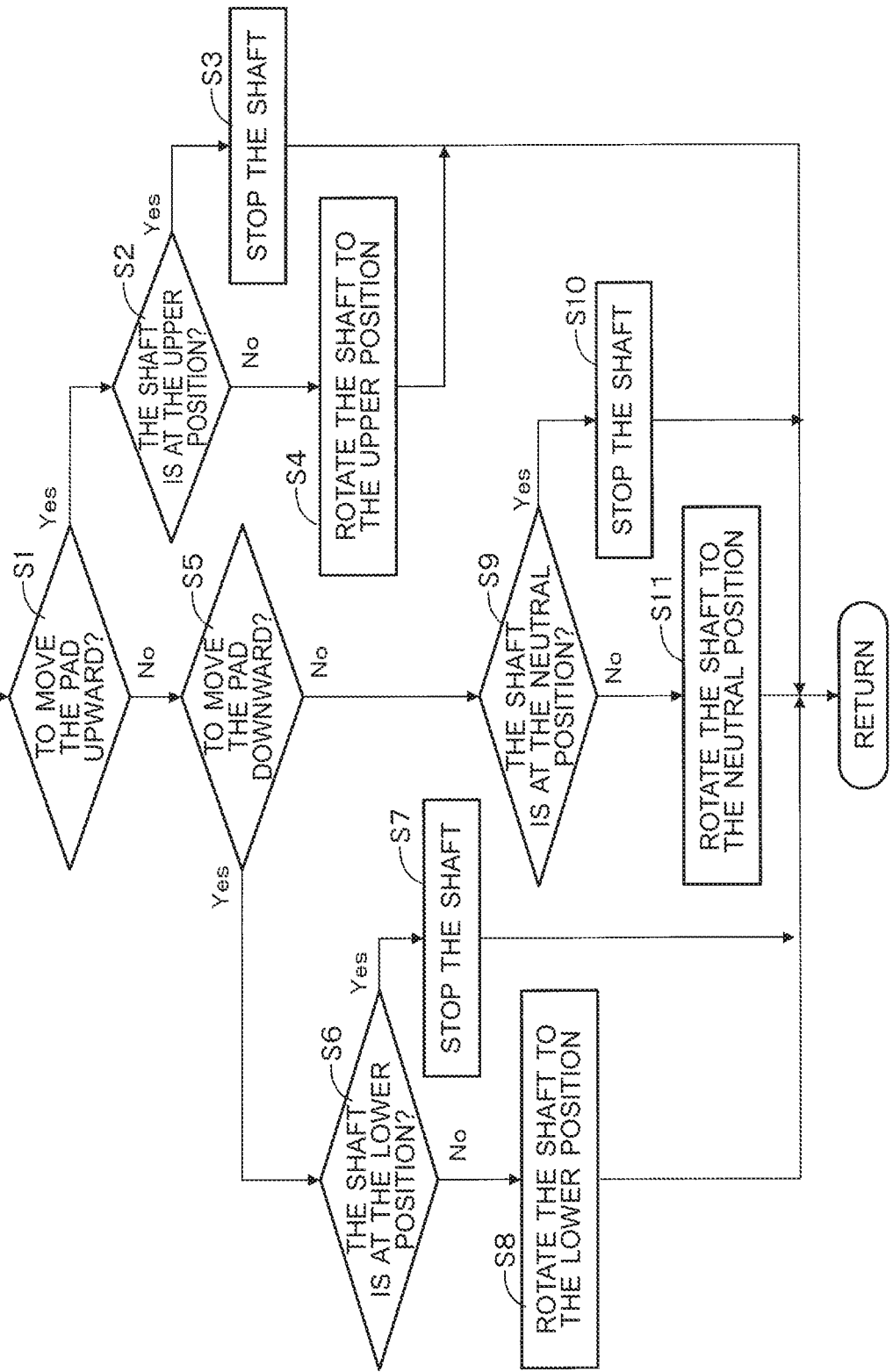
FIG. 5 is a flow chart showing an example of a driving control of the input device according to the first embodiment.

FIG. 5 is a flow chart showing an example of a driving control of the input device 10 according to the first embodiment. This processing is, for example, a processing of a controller of a car navigation system connected to the input device 10. First, the input device 10 can be depressed easily with a finger against the elastic force of the first and second springs 221 and 222. This depression amount is detected by the photo sensor 22c, and when the depression is detected, the operational input section 1 is moved downward. Further, owing to an operation with the touch pad 11, for example, when an icon of a selection list is selected, the touch pad 11 (operational input section 1) is moved upward.

The flow chart of FIG. 5 is a processing to control the vertical movement of the touch pad 11 (operational input section 1). Incidentally, in an explanation of FIG. 5 and an explanation below, the shaft 32 being at the upper position means that the rotational position of the shaft 32 where the operational input section 1 is at the uppermost end position (rotational position of FIG. 4C). Further, the shaft 32 being at the lower position means that the rotational position of the shaft 32 where the operational input section 1 is at the lowermost end position (rotational position of FIG. 4B). Further, the shaft 32 being at the neutral position means that the rotational position of the shaft 32 where the operational input section 1 is at the neutral position (rotational position of FIG. 4A).

First, in step S1, whether the instruction is to move the pad upward or not is judged. If the judgement is Yes, the processing goes to step S2, and if the judgement is No, the processing goes to step S5. In step S2, whether the shaft 32 is at the upper position or not is judged. If at the upper position, the shaft 32 (motor 31) is stopped in step S3 and the processing turns back to the original routine. If not at the upper position, the shaft 32 is rotated to the upper position in step S4. Namely, the shaft 32 is rotated so that the magnetic pole of the magnet 33 turns opposite to the magnetic pole of the magnet 34. Then, the processing turns back to the original routine.

In step S5, whether the instruction is to move the pad downward or not is judged. If the judgement is Yes, the processing goes to step S6, and if the judgement is No, the processing goes to step S9. In step S6, whether the shaft 32 is at the lower position or not is judged. If at the lower position, the shaft 32 (motor 31) is stopped in step S7 and the processing turns back to the original routine. If not at the lower position, the shaft 32 is rotated to the lower position in step S8. Namely, the shaft 32 is rotated so that the magnetic pole of the magnet 33 turns to be the same as the magnetic pole of the magnet 34. Then, the processing turns back to the original routine.

In step S9, whether the shaft 32 is at the neutral position or not is judged. If at the neutral position, the shaft 32 (motor 31) is stopped in step S10 and the processing turns back to the original routine. If not at the neutral position, the shaft 32 is rotated to the neutral position in step S11. Namely, the shaft 32 is rotated so that the magnetic pole of the magnet 33 turns perpendicular to the magnetic poles of the magnets 34 and 35. Then, the processing turns back to the original routine.

Second Embodiment

Figure 6:
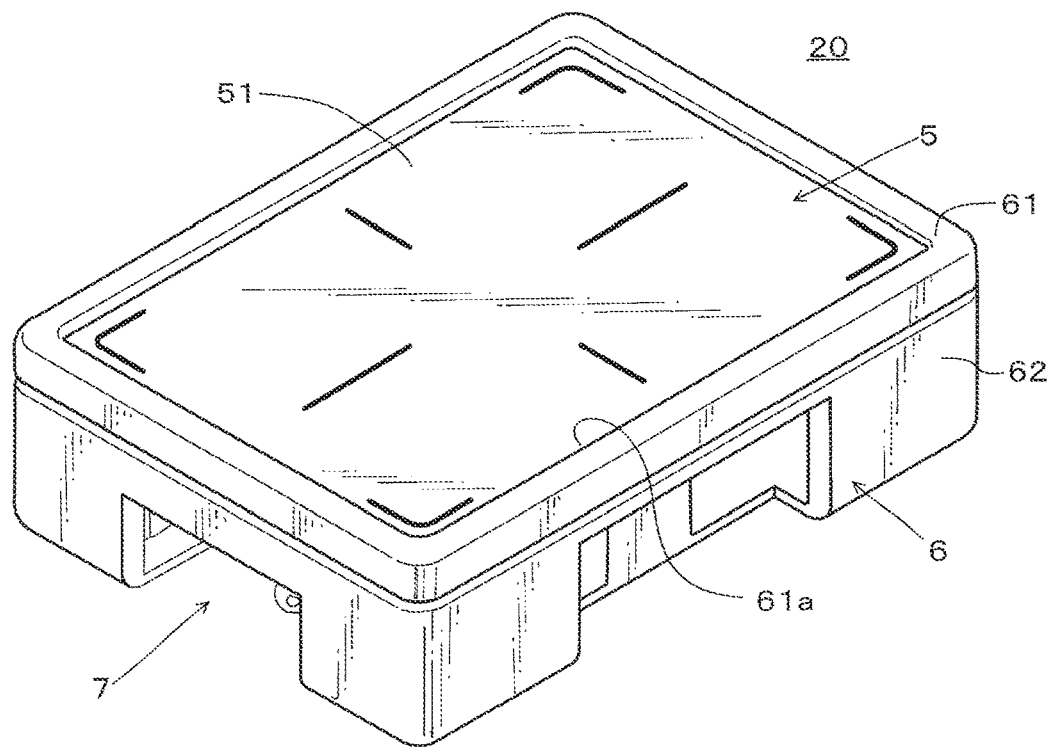
FIG. 6 is an external perspective view of an input device according to a second embodiment of the present invention.
Figure 7:
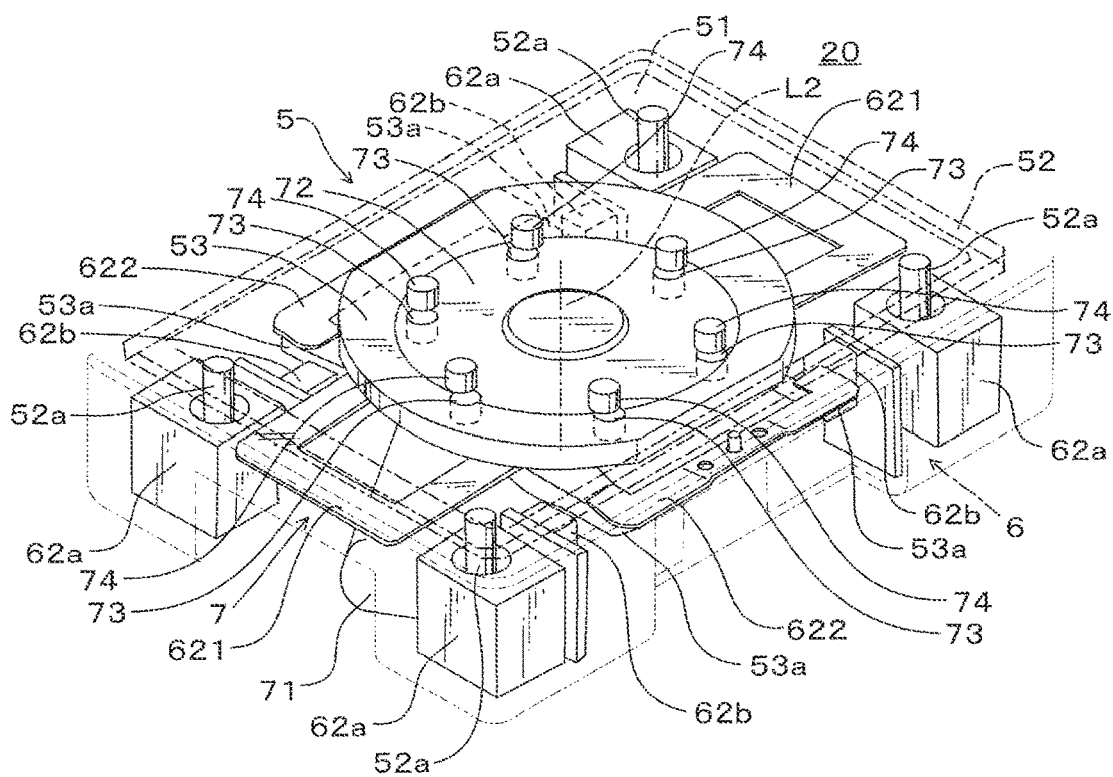
FIG. 7 is a perspective view showing a state that an upper case and a lower case are removed from the input device according to the second embodiment.
Figure 8:
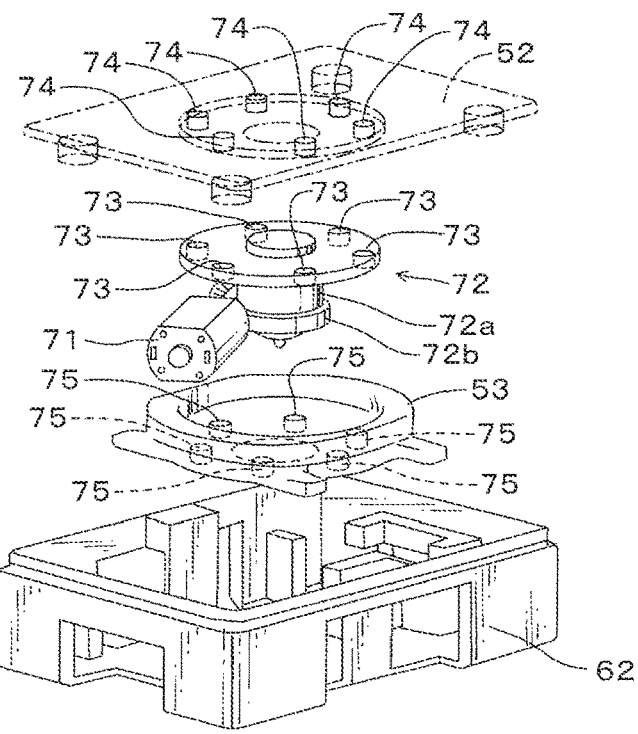
FIG. 8 is an exploded perspective view of a main part of the input device according to the second embodiment.
Figure 9:
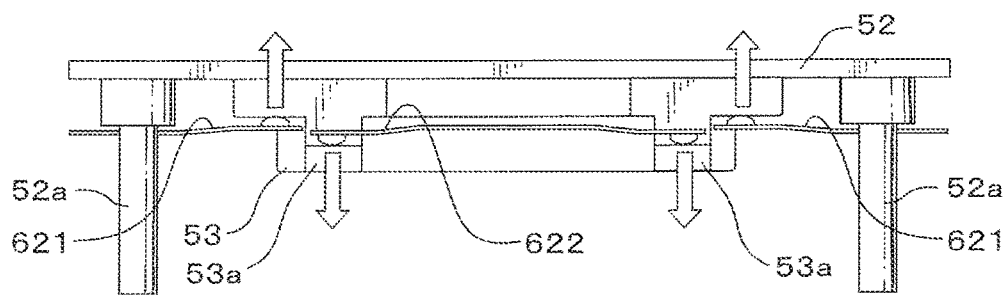
FIG. 9 is an explanatory view explaining an operation of a plate spring as an example of an elastic member according to the second embodiment.
Figure 10:
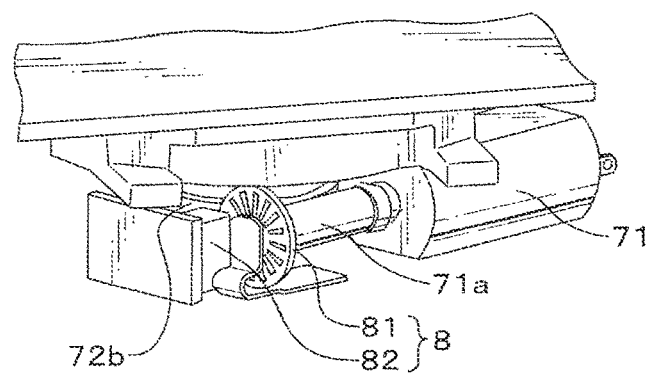
FIG. 10 is a schematic view showing a rotary encoder with respect to a motor according to the second embodiment.
Figure 11:
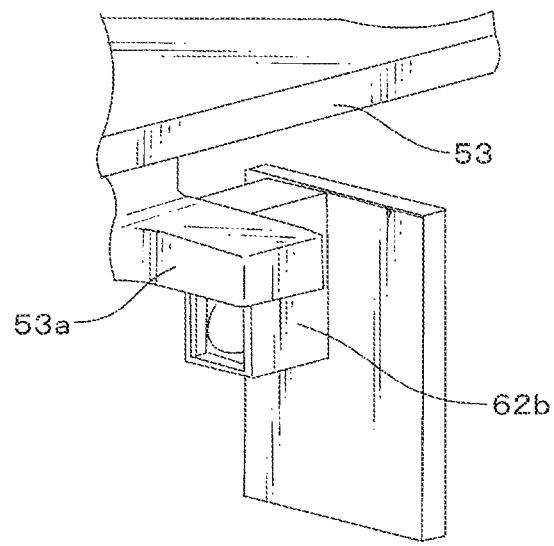
FIG. 11 is a schematic view showing a photo sensor for measuring a vertical position of an operational input section according to the second embodiment.
Figure 12:
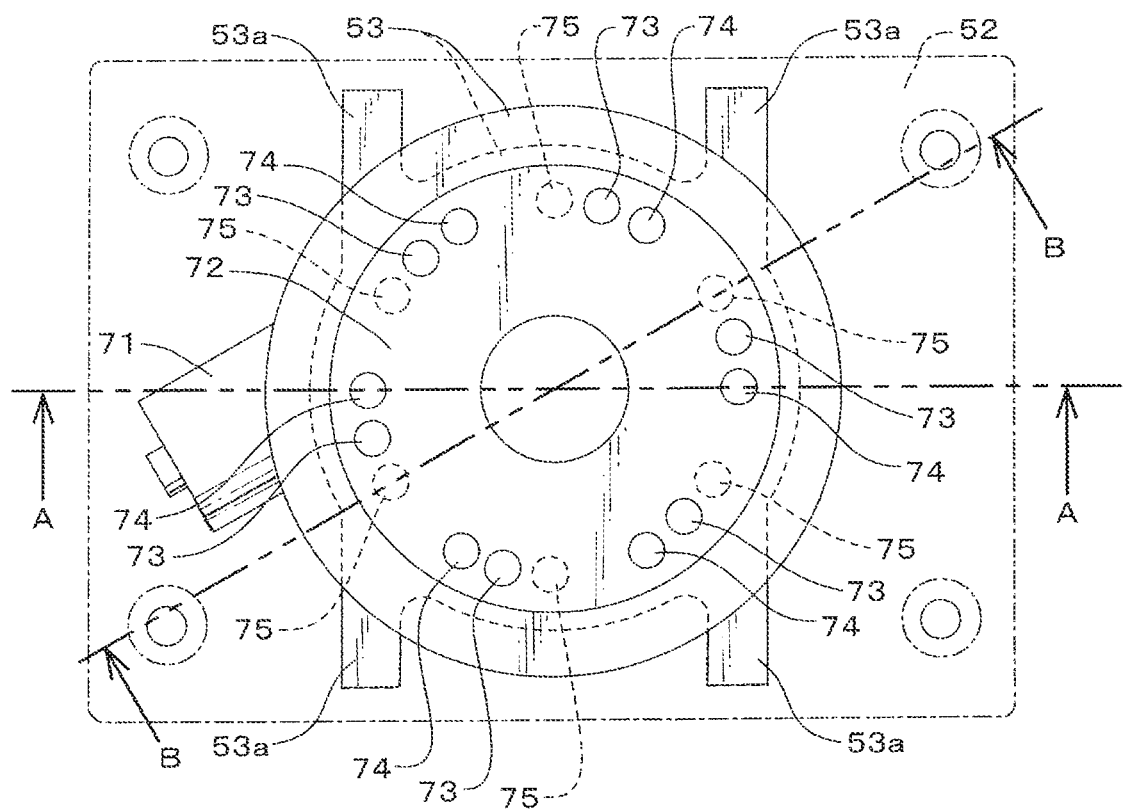
FIG. 12 is a partial plan view when the operational input section of the input device according to the second embodiment is at the neutral position.
Figure 13:
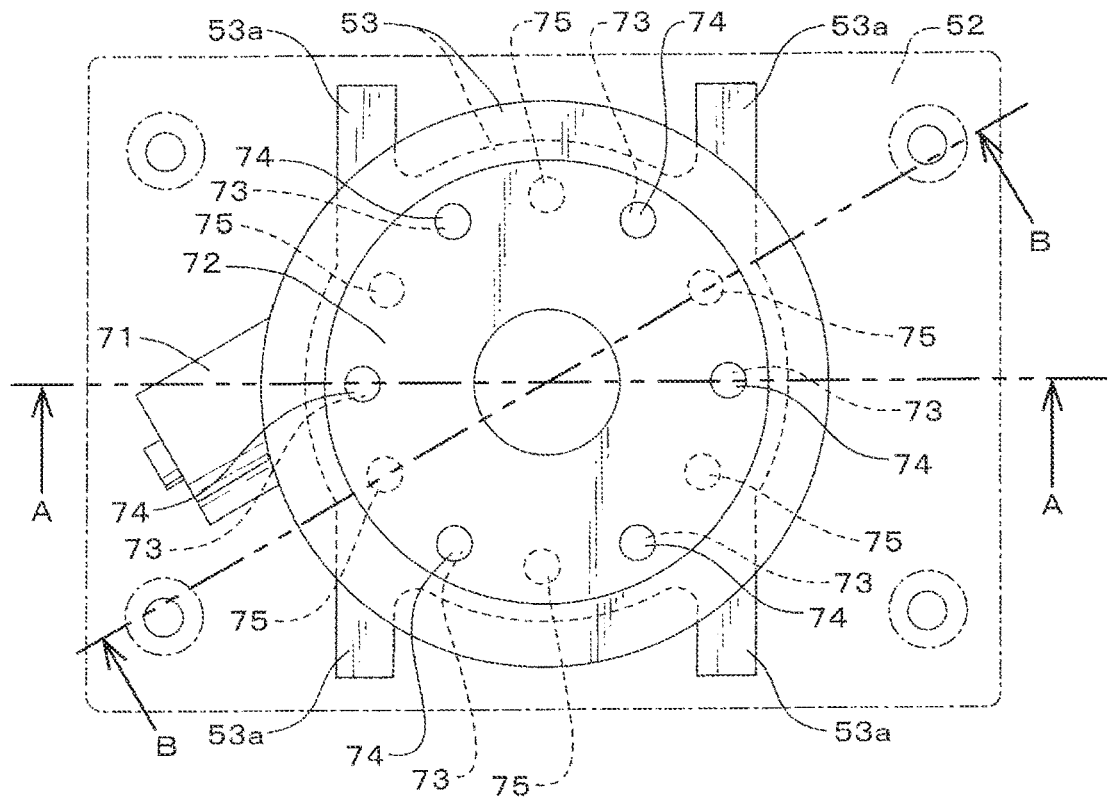
FIG. 13 is a partial plan view when the operational input section of the input device according to the second embodiment is moved downward.
Figure 14:
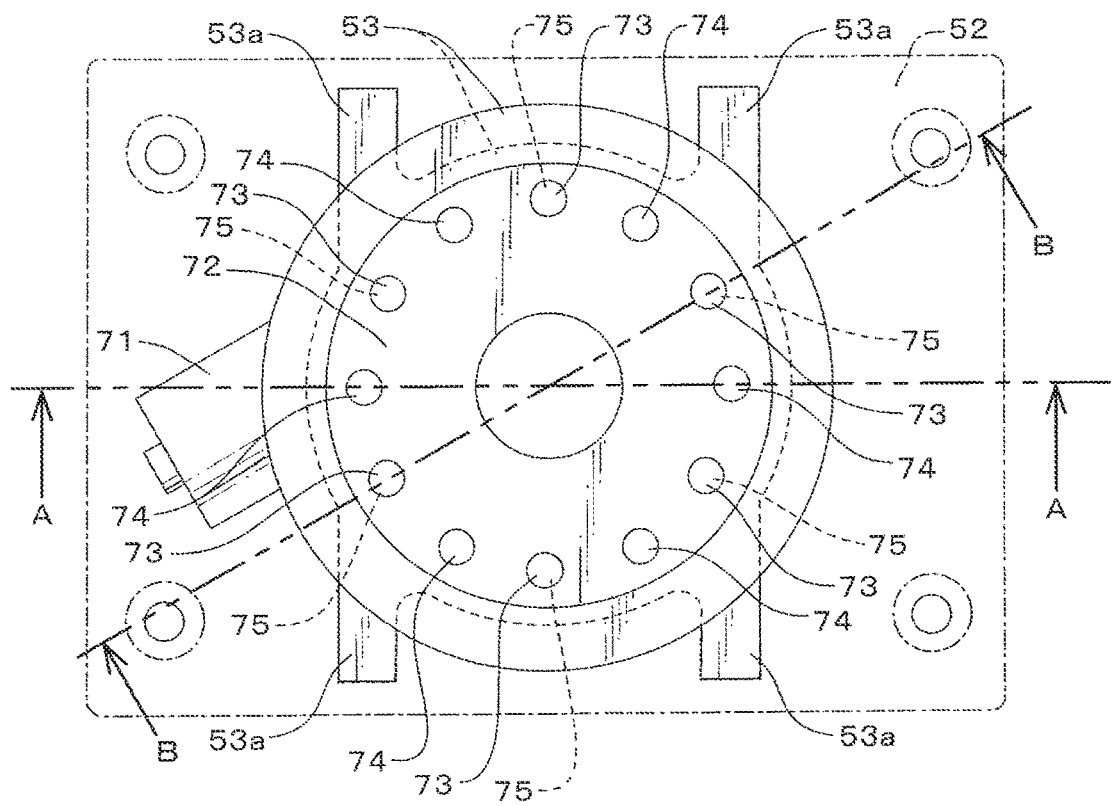
FIG. 14 is a partial plan view when the operational input section of the input device according to the second embodiment is moved upward.

FIG. 6 is an external perspective view of an input device 20 according to a second embodiment of the present invention. FIG. 7 is a perspective view showing a state that an upper case and a lower case are removed from the input device 20 according to the second embodiment. FIG. 8 is an exploded perspective view of a main part of the input device 20 according to the second embodiment. FIG. 9 is an explanatory view explaining an operation of a plate spring as an example of an elastic member according to the second embodiment. FIG. 10 is a schematic view showing a rotary encoder with respect to a motor according to the second embodiment. FIG. 11 is a schematic view showing a photo sensor for measuring a vertical position of an operational input section according to the second embodiment. FIG. 12 is a partial plan view when the input device 20 according to the second embodiment is at the neutral position. FIG. 13 is a partial plan view when the input device 20 according to the second embodiment is moved downward. FIG. 14 is a partial plan view when the input device 20 according to the second embodiment is moved upward. Similar to the first embodiment, this input device 20 is, for example, connected to a car navigation system of a vehicle, and provided on, for example, a center console between a driver seat and a front passenger seat, a steering, a door trim, or the like.

As shown in FIGS. 6 and 7, the input device 20 of the second embodiment includes: an operational input section 5 as an example of "a contact member" to be in contact with a contact body such as a finger of a user or a pointing pen; a housing 6 for supporting the operational input section 5 in a movable manner; and a drive device 7 for moving the operational input section 5 with respect to the housing 6 to change a height of a contact face of the operational input section 5 with respect to the housing 6.

As shown in FIG. 7, the operational input section 5 includes: a touch pad 51; a tactile pad base 52 for fixing the touch pad 51; and a tactile lower plate 53 attached to a rear face of the tactile pad base 52. Here, a rectangular surface of the touch pad 51 is "a contact face" to be in contact with the contact body. Further, a surface of the tactile pad base 52 is a face on which the touch pad 51 is arranged, and a rear face of the tactile pad base 52 is a face to the driving device 7 side. Incidentally, in figures, the touch pad 51 and the tactile pad base 52 are denoted by a chain line. Further, a height of the contact face of the operational input section 5 with respect to the housing 6 means a position (displacement) in a direction crossing the surface of the touch pad 51 (for example, orthogonal direction). Four corners of a rear face of the tactile pad base 52 are provided with rods 52a extending from the tactile pad base 52. Further, the tactile lower plate 53 is formed in a dish shape, and has four arms 53a for receiving the biasing force of a later-described second plate spring 622 around the dish shape (refer to FIG. 11). Then, the tactile pad base 52 and the tactile lower plate 53 are screwed and fixed while a later-described rotary plate 72 is arranged thereinside.

The housing 6 includes: an upper case 61 (refer to FIG. 6) having an opening 61a for arranging the touch pad 51; and a lower case 62 for receiving the operational input section 5 and the driving device 7. Four corners of the tactile pad base 52 are provided with the rods 52a extending from a rear face of the tactile pad base 52. Four corners in the lower case 62 are provided with thrust bearings 62a for bearing the rods 52a slidably in a thrust direction. Further, a pair of first plate springs 621 and a pair of second plate springs 622 are attached to the lower case 62. Owing to these first and second plate springs 621 and 622, the operational input section 5 (tactile lower plate 53) is held with respect to the lower case 62.

Namely, as shown in FIG. 9, the first plate spring 621 abuts on a rear side of the tactile lower plate 53 to bias the tactile lower plate 53 upward, and the second plate spring 622 abuts on an upper face of the arm 53a to bias the tactile lower plate 53 downward. FIG. 9 shows a state that the tactile pad base 52 is held in a neutral position where the tactile pad base do not receive an effect of magnetic force of the later-described driving device 7. The spring forces of the first and second plate springs 621, 622 are set smaller than the magnetic force, and larger than a weight of the operational input section 5. Thereby, the neutral position of the operational input section 5 (tactile pad base 52) is maintained. In this way, the first plate spring 621 controls an upward movement of the tactile pad base 52, and the second plate spring 622 controls a downward movement of the tactile pad base 52.

The driving device 7 includes: a motor 71; a rotary plate 72 as an example of rotatable "rotary body" rotated around a rotating axis L2 by the motor 71; a plurality of magnets 73 arranged on a circumference about the rotating axis L2 of the rotary plate 72; a plurality of magnets 74 provided on the tactile pad base 52 of the operational input section 5; and a plurality of magnets 75 provided on the tactile lower plate 53 of the operational input section 5 as shown in FIG. 8. Incidentally, in this embodiment, the number of each of the magnets 73, 74, and 75 is six. These magnets 73, 74, and 75 are permanent magnets. The magnets 73 are "first magnets" provided on the rotary plate 72 side. Further, magnets 34 and 35 are "second magnets" provided on the operational input section 5 side. The driving device 7 is fixed to the lower case 62 of the housing 6. The rotary plate 72 is interposed between the tactile pad base 52 and the tactile lower plate 53. Thereby, the rotary plate 72 is opposite to the operational input section 5 as the contact member.

As shown in FIG. 8, the rotary plate 72 has a cylinder section 72a and a rack gear 72b in a lower center thereof. Further, as shown in FIG. 10, a worm gear 71a to mesh with the rack gear 72b and a slit plate 81 of a rotary encoder 8 are attached to a driving shaft of the motor 71.

Then, owing to the driving of the motor 71, a torque of the motor 71 is transmitted to the rotary plate 72 via the worm gear 71a and the rack gear 72b, and the rotary plate 72 is rotated about the rotating axis L2. Further, the rotary encoder 8 is composed of the slit plate 81 and a photo sensor 82, and a rotational amount (number of rotations) from an initial position of the motor 71 (a position before the motor 71 is driven) is detected by an output signal of this photo sensor 82. Owing to the rotational amount from the initial position of the motor 71, a rotational angle from a specific initial position of the rotary plate 72 (a position before the shaft rotary plate 72 is rotated) is detected.

Further, a vicinity of the thrust bearing 62a in the lower case 62 is provided with photo sensors 62b. These photo sensors 62b respectively detect four arms 53a of the tactile lower plate 53. A vertical position of the operational input section 5 (tactile lower plate 53) is measured by these photo sensors 62b. As described above specifically, the vertical position means a height of the contact face of the operational input section 5 with respect to the lower case 62 of the housing 6. Namely, for preventing a false operation, an operation of the rotary plate 72 of the driving device 7 is started when the operational input section 5 is pushed into a specific height (a position at the housing 6 side with respect to the neutral position of the tactile pad base 52, and a position near the housing 6 in a specific distance from the neutral position). Incidentally, when a corner of the tactile pad base 52 is pushed by a finger, the operational input section 5 may not be depressed horizontally depending on a position of the finger. Therefore, the photo sensors 62b are arranged at four positions to keep a margin not to operate the driving device 7 even if the tactile pad base 52 is pushed into a specific amount.

As shown in the plan views of FIGS. 12 to 14, the six magnets 73 at the rotary plate 72 side, the six magnets 74 at the tactile pad base 52 side, and the six magnets 75 at the tactile lower plate 53 side (lower case 62 side) are separated from each other in angle 60 degrees each at regular intervals on the same circumference about the rotating axis L2. On the same circumference means that the positions separated away from the rotating axis L2 in a radius R (specific distance) and in the same distance from the rotating axis L2. Here, the magnetic poles of the magnets 74 at the tactile pad base 52 side, and the magnets 75 at the tactile lower plate 53 side are in the same direction, and the magnets 74 and 75 are arranged so as not to be overlapped with each other in a top view. Namely, the six magnets 74 at the tactile pad base 52 side, and the six magnets 75 at the tactile lower plate 53 side are arranged so as to be shifted at angle 30 degrees from each other. Incidentally, the positions of the six magnets 73 at the rotary plate 72 side shown in FIG. 12 correspond to a rotational position of the rotary plate 72 where the operational input section 5 is at the neutral position, namely, at the neutral positions between the magnets 74 at the tactile pad base 52 side and the magnets 75 at the tactile lower plate 53 side. Further, the positions of the six magnets 73 at the rotary plate 72 side shown in FIG. 13 are overlapped with the positions of the magnets 74 at the tactile pad base 52 side. Further, the positions of the six magnets 73 at the rotary plate 72 side shown in FIG. 14 are overlapped with the positions of the magnets 75 at the tactile lower plate 53 side. As described above, the magnets 73 and the magnets 74 or 75 are arranged so as to be able to face each other owing to a rotation of the rotary plate 72 by the driving device 7.

Figure 15A:
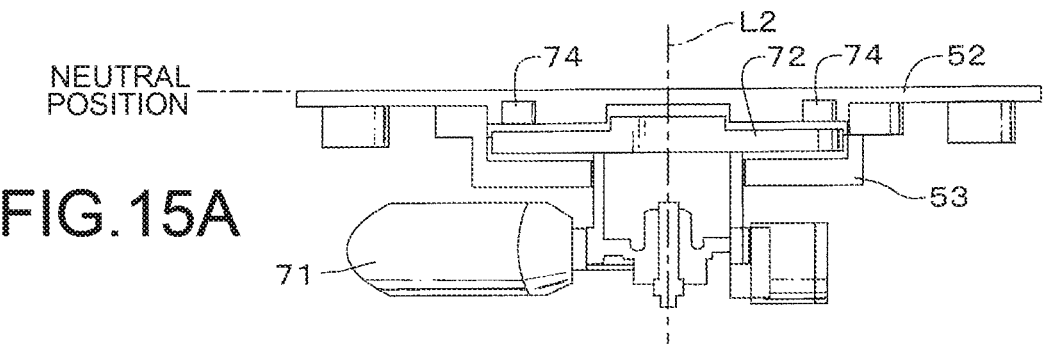
FIGS. 15A and 15B are vertical sectional views when the operational input section of the input device according to the second embodiment is at the neutral position.
Figure 15B:
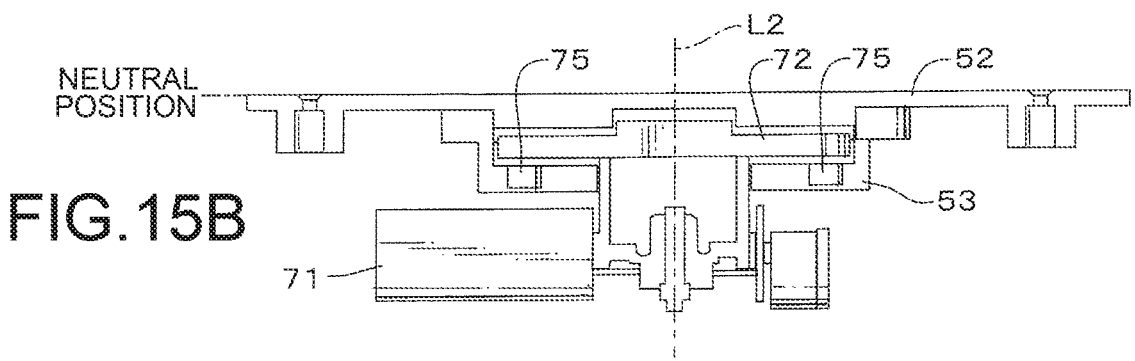
Figure 16A:
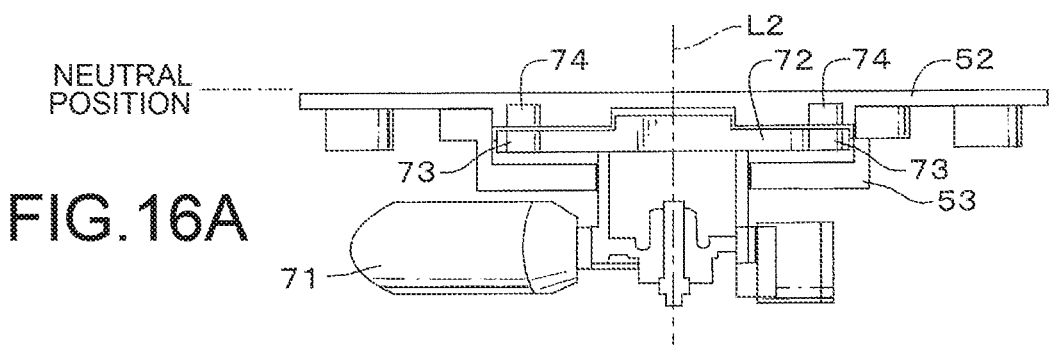
FIGS. 16A and 16B are vertical sectional views when the operational input section of the input device according to the second embodiment is moved downward.
Figure 16B:
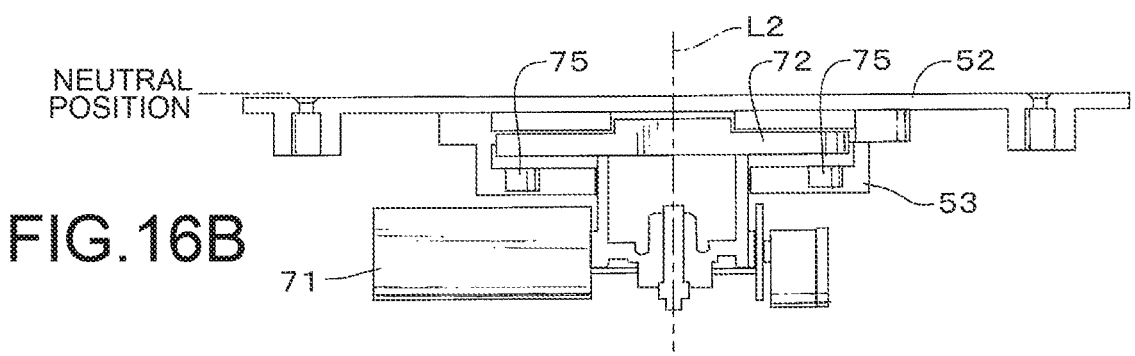
Figure 17A:
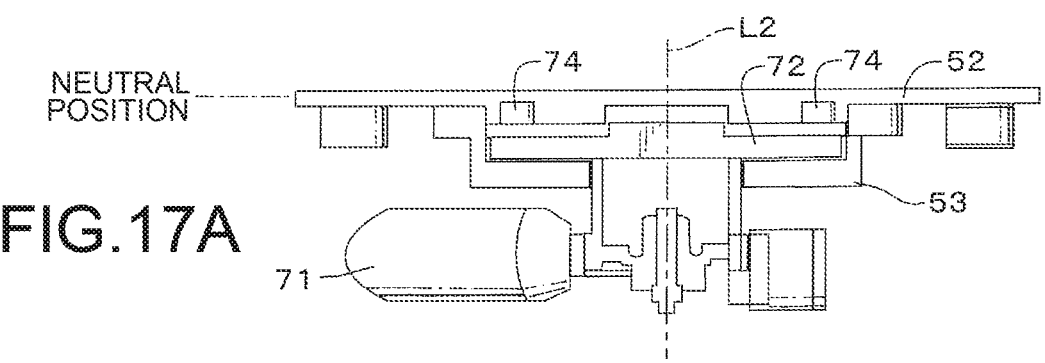
FIGS. 17A and 17B are vertical sectional views when the operational input section of the input device according to the second embodiment is moved upward.
Figure 17B:
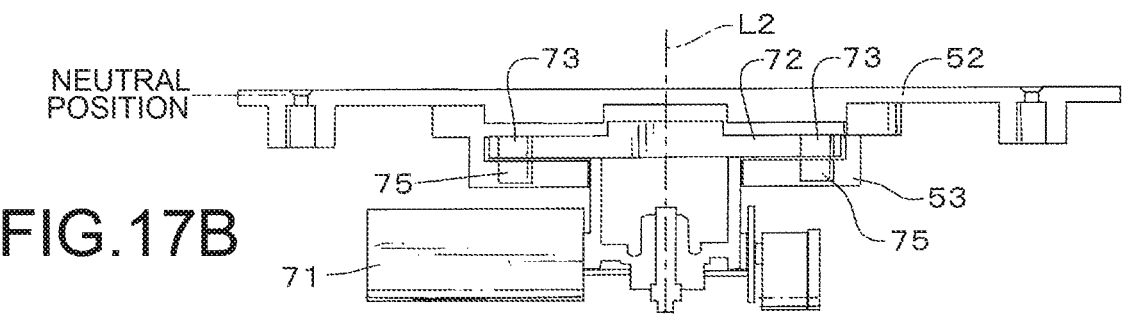
Figure 18A:
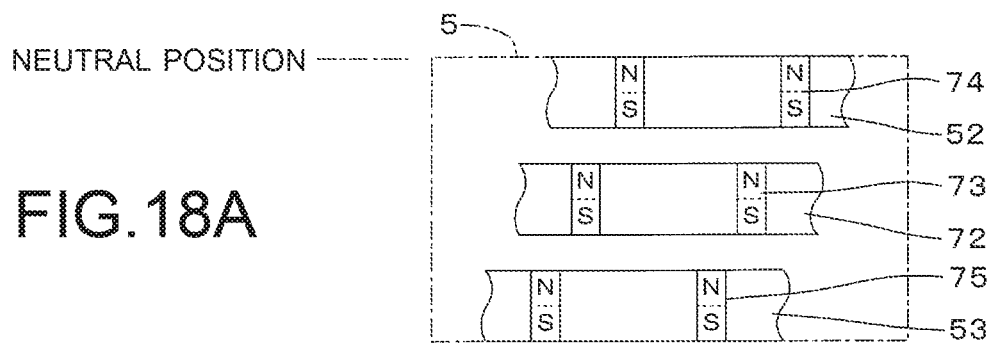
FIGS. 18A to 18C are schematic views showing relationships among a rotational position of a rotary plate, the vertical position of the operational input section, and magnetic poles of magnets.
Figure 18B:
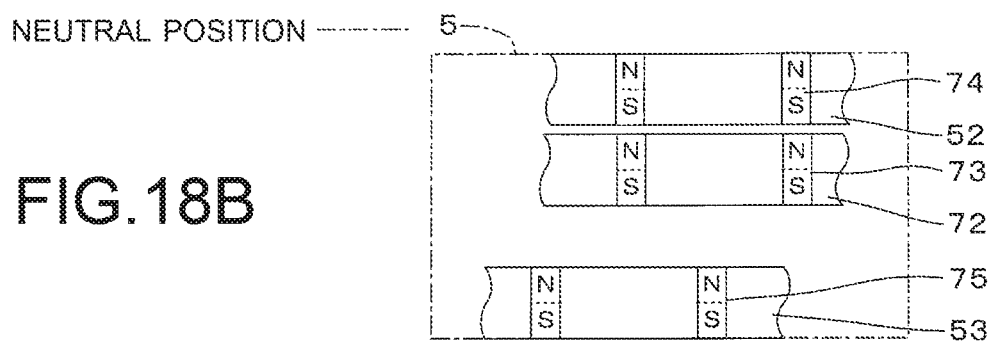
Figure 18C:
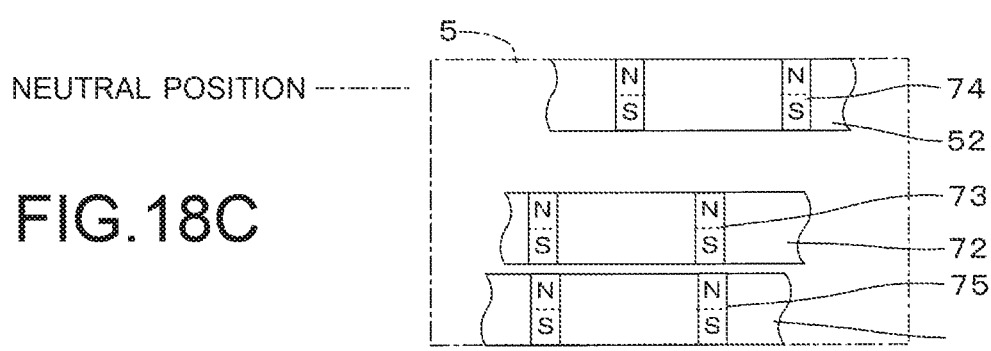

FIGS. 15A and 15B are vertical sectional views when the operational input section 5 is at the neutral position. FIGS. 16A and 16B are vertical sectional views when the operational input section 5 is moved downward. FIGS. 17A and 17B are vertical sectional views when the operational input section 5 is moved upward. FIG. 15A is a sectional view taken on line A-A of FIG. 12. FIG. 15B is a sectional view taken on line B-B of FIG. 12. FIG. 16A is a sectional view taken on line A-A of FIG. 13. FIG. 16B is a sectional view taken on line B-B of FIG. 13. FIG. 17A is a sectional view taken on line A-A of FIG. 14. FIG. 17B is a sectional view taken on line B-B of FIG. 14. Further, FIGS. 18A to 18C are schematic views showing relationships among a rotational position of the rotary plate 72, the vertical position of the operational input section 5, and magnetic poles of magnets 73, 74, and 75. FIG. 18A shows a case that the operational input section 5 is at the neutral position, FIG. 18B shows a case that the operational input section 5 is moved downward, and FIG. 18C shows a case that the operational input section 5 is moved upward.

As shown in FIGS. 15A to 15C and 18A, when the rotary plate 72 is stopped at a middle position where the magnet 73 is in between the magnets 74 and 75, the magnetic force by the magnets 73 and 74 and the magnetic force by the magnets 73 and 75 become the same, and the operational input section 5 turns to the neutral position. In contrast, as shown in FIGS. 16A to 16C and 18B, when the rotary plate 72 is rotated so that the magnet 73 is at the position of magnet 74, the magnets 73 and 74 absorb each other, and the operational input section 5 is moved downward from the neutral position. Further, as shown in FIGS. 17A to 17C and 18C, when the rotary plate 72 is rotated so that the magnet 73 is at the position of magnet 75, the magnets 73 and 75 absorb each other, and the operational input section 5 is moved upward from the neutral position.

In this way, permanent magnets 74, 73, 75 are respectively embedded in a lower face of the tactile pad base 52, the rotary plate 72, and an upper face of the tactile lower plate 53. The tactile pad base 52 and the tactile lower plate 53 are fixed, and the operational input section 5 is movable in a vertical direction about ±1 mm with respect to the housing 6. Further, the rotary plate 72 is interposed between the tactile pad base 52 and the tactile lower plate 53, and fixed to the housing 6. Further, the rotary plate 72 can be rotated about the rotating axis L2 by a driving force of the motor 71. The number of rotations (rotational amount) of the motor 71 is measured using the rotary encoder 8, and thereby the rotational angle of the rotary plate 72 can be set at the specific position. The rotary plate 72 can be rotated to the specific position with the motor 71, and thereby the tactile pad base 52 can be moved in a vertical direction about ±1 mm from the neutral position using the absorption force and the repelling force of the magnets 73, 74, and 75.

Then, when the motor 71 is stopped at a position where the magnets 73, 74 and 75 absorb each other and repel each other, the operational input section 5 (tactile pad base 52) can be stopped and held at +1 mm or −1 mm height without applying electric current. Further, when the motor 71 is stopped at a position where the magnets 73, 74 and 75 do not absorb each other and do not repel each other, the operational input section 5 (tactile pad base 52) can be stopped at 0 mm height from the neutral position.

Further, when the positive rotation and the negative rotation of the motor 71 is continued before and after a position where the magnetic forces of the magnets 73, 74, and 75 are changed, the operational input section 5 (touch pad 51) can be oscillated in a desired frequency. Incidentally, one or more magnets 74, 75 can be used for embedding in the tactile pad base 52 and the tactile lower plate 53. However, the driving force can be increased when a plurality of magnets are arranged in the same direction for moving the tactile pad base 52 in a vertical direction, and the absorption force and the repelling force are generated at the same time at the specific rotational position of the rotary plate 72. Any numbers of the magnets 73 for embedding in the rotary plate 72 can be used. Further, when the number of magnets 73 for embedding in the rotary plate 72 is increased and the distance between the adjacent magnets 73 is reduced, the magnets can be met with a small rotational amount, and thereby a time lag from a start of the motor 71 to a start of driving the tactile pad base 52 can be reduced.

Incidentally, in the above embodiment, the rotational position of the rotary plate 72 is detected by the rotational amount of the motor 71 measured with the rotary encoder 8. However, for example, a hole element may be provided on a rear side of the tactile lower plate 53, and the position of the magnet 73 at the rotary plate 72 side may be detected by this hole element to detect the rotational position of the rotary plate 72.

Figure 19:
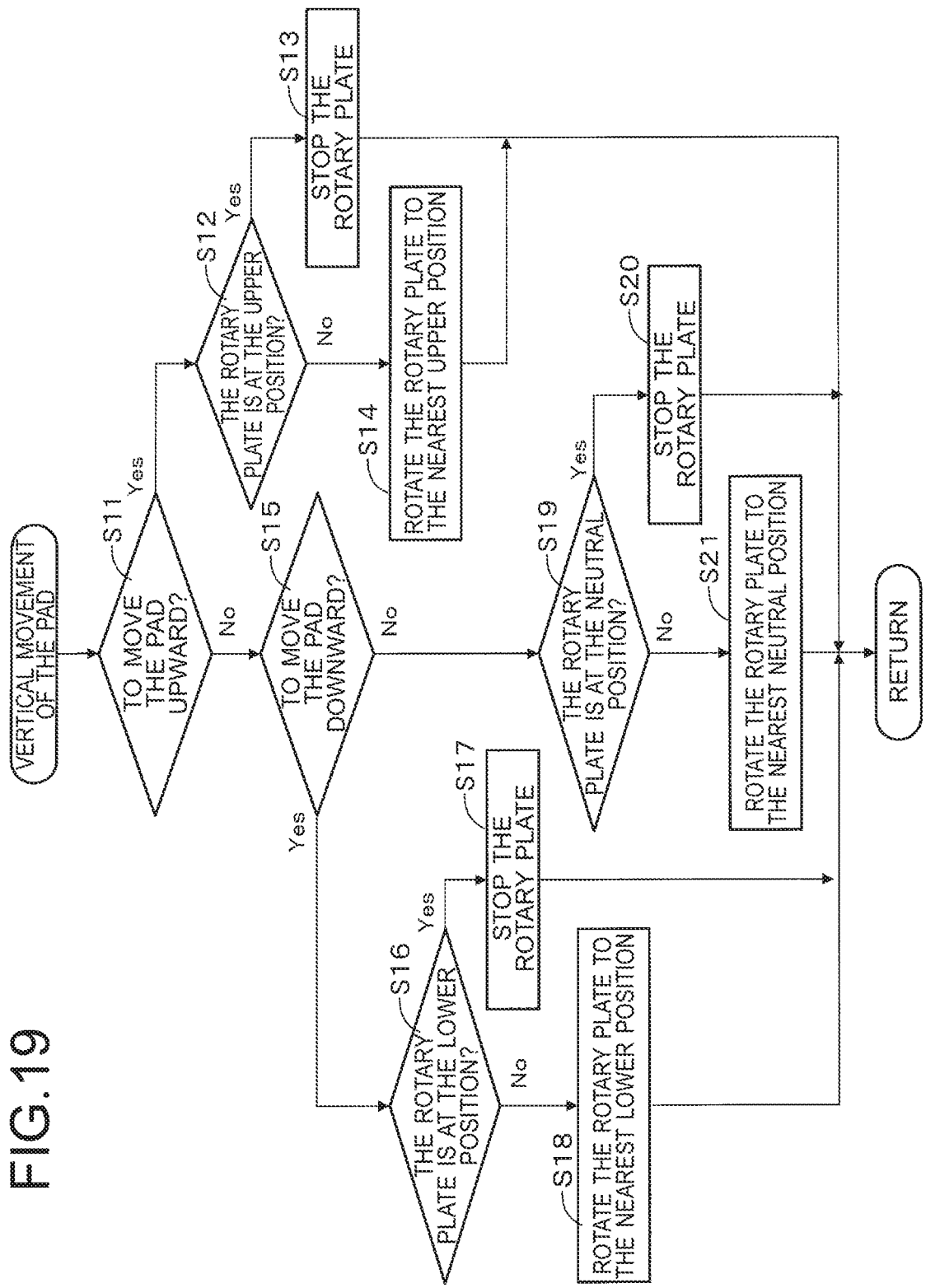
FIG. 19 is a flow chart showing an example of a driving control of the input device according to the second embodiment.

FIG. 19 is a flow chart showing an example of a driving control of the input device 20 according to the second embodiment. This processing is, for example, a processing of a controller of a car navigation system connected to the input device 20. First, the input device 20 can be depressed easily with a finger against the elastic force of the first and second plate springs 621 and 622. This depression amount is detected by the photo sensor 62b, and when the depression is detected, the operational input section 5 is moved downward. Further, owing to an operation with the touch pad 51, for example, when an icon of a selection list is selected, the touch pad 51 (operational input section 5) is moved upward.

The flow chart of FIG. 19 is a processing to control the vertical movement of the touch pad 51 (operational input section 5). Incidentally, in an explanation of FIG. 19 and an explanation below, the rotary plate 72 being at the upper position means that the rotational position of the rotary plate 72 where the operational input section 5 is at the uppermost end position. Further, the rotary plate 72 being at the lower position means that the rotational position of the rotary plate 72 where the operational input section 5 is at the lowermost end position. Further, the rotary plate 72 being at the neutral position means that the rotational position of the rotary plate 72 where the operational input section 5 is at the neutral position.

First, in step S11, whether the instruction is to move the pad upward or not is judged. If the judgement is Yes, the processing goes to step S12, and if the judgement is No, the processing goes to step S15. In step S12, whether the rotary plate 72 is at the upper position or not is judged. If at the upper position, the rotary plate 72 (motor 71) is stopped in step S13 and the processing turns back to the original routine. If not at the upper position, the rotary plate 72 is rotated to the nearest upper position in step S14. Namely, the rotary plate 72 is rotated so that the magnet 73 meets a position of the nearest magnet 75. Then, the processing turns back to the original routine.

In step S15, whether the instruction is to move the pad downward or not is judged. If the judgement is Yes, the processing goes to step S16, and if the judgement is No, the processing goes to step S19. In step S16, whether the rotary plate 72 is at the lower position or not is judged. If at the lower position, the rotary plate 72 (motor 71) is stopped in step S17 and the processing turns back to the original routine. If not at the lower position, the rotary plate 72 is rotated to the nearest lower position in step S18. Namely, the rotary plate 72 is rotated so that the magnet 73 meets a position of the nearest magnet 74. Then, the processing turns back to the original routine.

In step S19, whether the rotary plate 72 is at the neutral position or not is judged. If at the neutral position, the rotary plate 72 (motor 71) is stopped in step S20 and the processing turns back to the original routine. If not at the neutral position, the rotary plate 72 is rotated to the nearest neutral position in step S21. Namely, the rotary plate 72 is rotated so that the magnet 73 meets the nearest center position between the magnets 74 and 75. Then, the processing turns back to the original routine.

According to the above embodiments, because the operational input section is moved by the magnetic force of the magnet, if the operational input section is continued stopping at the specific position, the electric power is not consumed, and an operational noise caused by physical contact upon operating can be reduced.

In the first embodiment, the operational input section 1 can be held in the neutral position owing to the first and second springs 221 and 222. Namely, the operational input section 1 as the contact member is held in the neutral position with respect to the shaft 32 owing to the elastic member (first and second springs 221 and 222) provided on the housing 2.

Further, the rotating axis L1 of the shaft 32 is oriented in a direction crossing a moving direction of the operational input section 1, and the shaft 32 is rotatable about the rotating axis L1. Further, the magnet 33 is provided on a side face of the shaft 32 opposite to the operational input section 1 about the rotating axis L1. Therefore, by controlling the rotational position of the shaft 32, a vertical position of the operational input section 1 can be controlled.

A plurality of magnets 33 at the shaft 32 side and a plurality of magnets 34 and 35 at the operational input section 1 side are arranged so as to face each other. Therefore, magnetic forces of the plurality of magnets cooperate to obtain strong driving force.

Further, the magnets 34 and 35 at the operational input section 1 side are arranged parallel to the rotating axis L1 of the shaft 32 in a manner holding the magnet 33 at the shaft 32 side therebetween. Therefore, the rotational position of the shaft 32 can be controlled as a rotational angle of 90 degrees, thereby the processing becomes easy.

Furthermore, a plurality of magnets 34 at one (upper side) at the operational input section 1 side and a plurality of magnets 35 at the other (lower side) at the operational input section 1 side are arranged in a manner holding a plurality of magnets 33 at the shaft 32 side therebetween. Therefore, the magnetic forces work at the upper and lower sides of the operational input section 1 facing each other to stabilize the operation of the operational input section 1.

Further, regarding the magnet 33 at the shaft 32 side, and magnets 34 or 35 at the operational input section 1 side opposite to each other, one pair of magnets has magnetic poles different from each other, and the other pair of magnets has the same magnetic poles. Thereby, the operational input section 1 can be driven by the absorbing magnetic force and repelling magnetic force.

Further, the operational input section 1 is held at the neutral position with respect to the shaft 32 by the first and second springs 221 and 222 (elastic member) provided on the housing 2. Therefore, the operational input section 1 can be held at the neutral position with a simple configuration.

Further, the input device 10 has the rotary encoder 4 (sensor) for measuring the number of rotations of the motor 31, and a photo sensor 22c (sensor) for measuring a position of the operational input section 1. Thereby, a precise position control can be carried out.

In the second embodiment, the operational input section 5 can be held in the neutral position owing to the first and second plate springs 621 and 622. Namely, the operational input section 5 as the contact member is held in the neutral position away from the rotary plate 72 in a specific distance owing to the elastic member (first and second plate springs 621 and 622) provided on the housing 6.

Further, the rotating axis L2 of the rotary plate 72 is oriented in a moving direction of the operational input section 5, and the rotary plate 72 is rotatable about the rotating axis L2. Further, the magnet 73 is provided on the same circumference of a face opposite to the operational input section 5 about the rotating axis L2. Therefore, by controlling the rotational position of the rotary plate 72, a vertical position of the operational input section 5 can be controlled.

A plurality of magnets 73 at the rotary plate 72 side and a plurality of magnets 74 and 75 at the operational input section 5 side are arranged so as to face each other. Therefore, magnetic forces of the plurality of magnets cooperate to obtain strong driving force.

Further, because the plurality of magnets 73, 74, and 75 is arranged at regular intervals on the same circumferential about the rotating axis L2 of the rotary plate 72, the rotational position of the rotary plate 72 is controlled as a rotational angle at regular intervals, and thereby a processing becomes easy.

Further, the plurality of magnets 73, 74, and 75 is arranged at an outer periphery side than the center of the operational input section 5, the magnet forces act on the outer periphery so that an operation of the operational input section 5 becomes stable.

Further, because a pair of magnets of the magnet 73 at the rotary plate 72 side and the magnets 74 or 75 at operational input section 5 side the facing each other has different magnetic poles, the operational input section 5 can be driven by adsorbing magnetic forces.

Further, the operational input section 5 is held at the neutral position away from the rotary plate 72 in a specific distance by the first and second plate springs 621 and 622 (elastic member) provided on the housing 6. Therefore, the operational input section 5 can be held at the neutral position with a simple configuration.

Further, the input device 5 has the rotary encoder 8 (sensor) for measuring the number of rotations of the motor 71, and a photo sensor 62b (sensor) for measuring a position of the operational input section 5. Thereby, a precise position control can be carried out.

Third Embodiment

Figure 20:
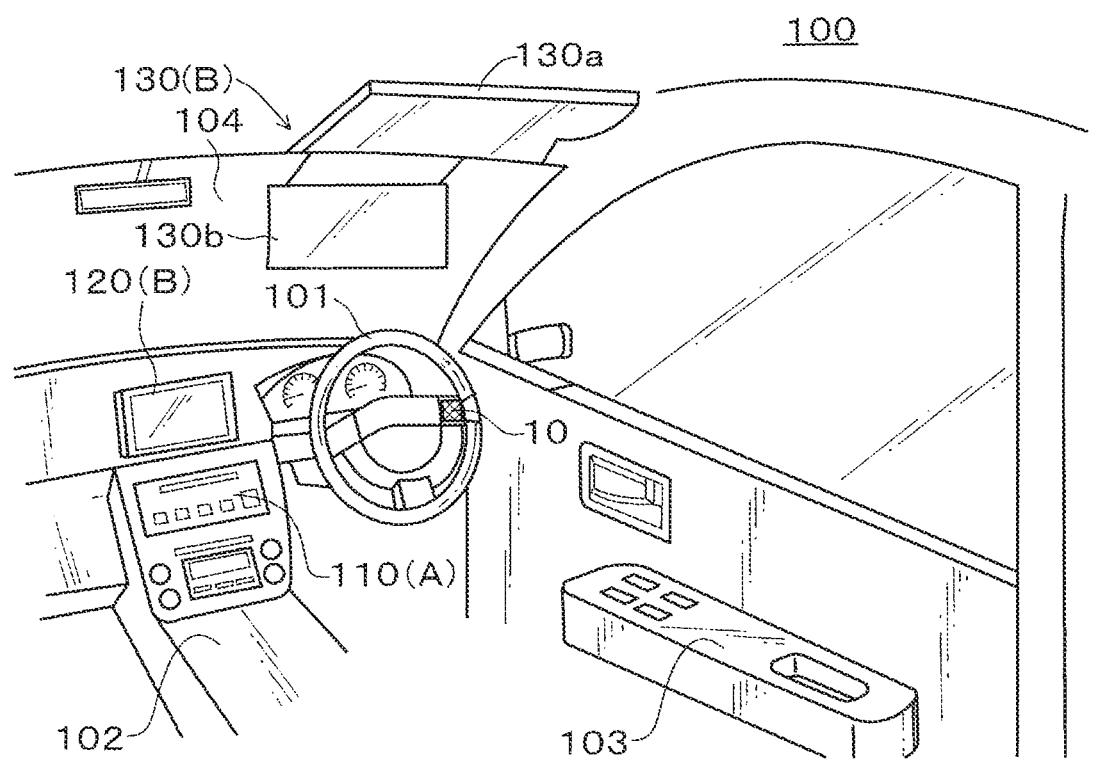
FIG. 20 is a schematic view of a movable body according to a third embodiment.
Figure 21:
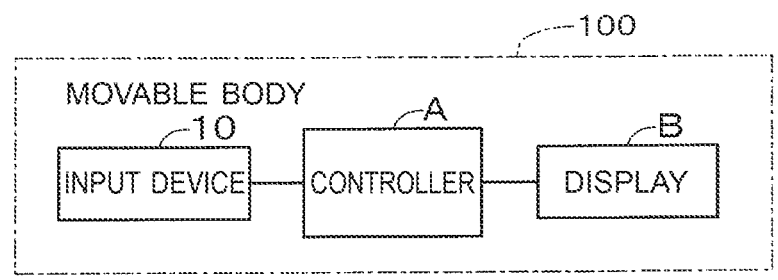
FIG. 21 is a bock diagram of the movable body according to the third embodiment.

FIG. 20 is a schematic view of a movable body according to a third embodiment, and FIG. 21 is a bock diagram of the movable body. The input device 10 of the first embodiment or the input device 20 of the second embodiment is applied to this movable body 100. In the following explanation, an example that the input device 10 of the first embodiment is applied will be explained. In a case that the input device 20 of the second embodiment is applied, the configurations are similar to the followings.

As shown in FIG. 21, the movable body 100 includes: the input device 10; a controller A; and a display B. The input device 10 is connected to the display B via the controller A. The controller A outputs the operational image as an object of the input operation by the input device 10 to the display B to display this image. Further, based on the input operation by the input device 10, the controller A displays new operational image or other image on the display B. Thereby, a user such as a driver can carry out an input operation such as selecting the operational image using the input device 10 without continuously watching the operational image displayed on the display B.

Specifically, as shown in FIG. 20, the input device 10 is mounted on a part of a steering 101, a center console 102, or a door trim 103 of the movable body 100. In this example shown, the input device 10 is mounted on a part of the steering 101. The movable body 100 is provided with a navigation device 110 as the controller A, and the navigation device 110 includes a display 120 as the display B. Further, the navigation device 110 is connected to a head-up display 130 as the display B. For example, the head-up display 130 includes: a light source 130a embedded in a ceiling for emitting toward a windshield 104; and a combiner 130b provided and attached on a front upper position of the driver on the windshield for reflecting the light emitted from the light source 130a toward the driver. Further, the input device 10 is connected to the navigation device 110. In this way, the display 120 or the head-up display 130 as the display B is provided at a position different from a position of the input device 10. Incidentally, the combiner 130 may be provided on a dashboard.

According to the above configuration, the input device 10 can be used while watching the operational image displayed on the display 120 or the head-up display 130, or used as an input device for operating input without watching the operational image. Here, as the operational image displayed on the display 120 or the head-up display 130, for example, an icon as a selected object can be used. Further, as an input operation of the input device 10, the user can push down the operational input section 1 or 5 in a specific height by a contact body such as a finger as described in the first and second embodiments.

Heretofore, the embodiments of the present invention have been described in detail with reference to figures. However, specific configurations are not limited to these embodiments, and design changes or the like without departing from the scope of the present invention are included in the present invention.

In the first embodiment, C-shaped movable blocks 13 are employed. However, when the magnetic force able to move the tactile pad base 12 is ensured, only the upper block 131 or the lower block 132 of the movable blocks 13 may be employed.

In the first and second embodiments, the magnets are directly attached to the shaft 32 and the rotary plate 72 as the rotary body. However, the present invention is not limited to these, and the magnets may be attached to the shaft 32 and the rotary plate 72 via the members other than the shaft 32 and the rotary plate 72.

A driving device including: a motor 31; a feed screw as the rotary body rotated by rotational force of the motor 31; and a movable member provided with a magnet and to which the feed screw is attached may be employed without limited to the first nor second embodiments. According to this driving device, owing to a movement of the movable member along a rotating axis of the feed screw, magnets provided on the movable member are moved with respect to magnets provided on the contact member to move the contact member. Incidentally, when the rotational direction of the motor 31 is clockwise (normal rotation) or counter-clockwise (reverse rotation), the moving direction of the magnets provided on the movable member can be changed.

The embodiments shown by figures above can be combined with each other as long as there is neither contradiction nor problem in objects and configurations. Further, each of the embodiments of the present invention shown in figures can be an independent embodiment, and not limited to one embodiment combined the figures.

REFERENCE SIGNS LIST 10 input device
1 operational input section
11 touch pad
12 tactile pad base
13 movable block
131 upper block
132 lower block
13a flame
13b boss section
2 housing
21a opening
21 upper case
22 lower case
22b flame
22c photo sensor
221 first spring
222 second spring
23 bearing
3 driving device
31 motor
31a pinion
32 shaft (example of rotary body)
32a spur gear
33 magnet (first magnet)
34 magnet (second magnet)
35 magnet (second magnet)
L1 axis
4 rotary encoder
41 slit plate
42 photo sensor
20 input device
5 operational input section
51 touch pad
52 tactile pad base
53 tactile lower plate
52a rod
53a arm
6 housing
61 upper case
61a opening
62 lower case
62a thrust bearing
62b photo sensor
621 first plate spring
622 second plate spring
7 driving device
71 motor
71a worm gear
72 rotary plate (example of rotary body)
72b rack gear
73 magnet (first magnet)
74 magnet (second magnet)
75 magnet (second magnet)
L2 axis
8 rotary encoder
81 slit plate
82 photo sensor
100 movable body
A controller
B display
110 navigation device (controller)
120 display (display)
130 head up display (display)

The invention claimed is:

1. An input device comprising:
a contact member to be in contact with a contact body;
a housing for supporting the contact member in a movable manner; and
a drive device for moving the contact member with respect to the housing to change a height of a contact face of the contact member with respect to the housing,
wherein the drive device is equipped with a rotatable rotary body, one or a plurality of first magnets disposed on the rotary body, and one or a plurality of second magnets disposed on the contact member,
wherein the first magnet and the second magnet are arranged so as to be able to face each other, and
wherein, during rotation of the rotary body, a position of the first magnet changes according to a rotation position of the rotary body, and wherein a relative position of the first magnet with respect to the second magnet changes with a change in the rotation position of the rotary body responsive to rotation of the rotary body.

2. The input device as claimed in claim 1,
wherein the rotary body is a shaft arranged opposite to the contact member, and
wherein a magnetic pole of the first magnet is provided on a side face around a rotating axis of the shaft.

3. The input device as claimed in claim 1,
wherein the rotary body is a rotary plate arranged opposite to the contact member, and
wherein the first magnet is provided at a position away from a rotating axis of the rotary plate in a specific distance.

4. The input device as claimed in claim 2,
wherein the plurality of first magnets is arranged along the rotating axis of the shaft, and
wherein the plurality of second magnets is arranged so as to be able to face the first magnets.

5. The input device as claimed in claim 3,
wherein the plurality of first magnets is provided on the rotary plate, and
wherein the plurality of second magnets is arranged on a face of the contact member opposite to the first magnets.

6. The input device as claimed in claim 5,
wherein the plurality of first magnets provided on the rotary plate is arranged at regular intervals in a circumferential direction of the rotary plate.

7. The input device as claimed in claim 4,
wherein the plurality of first magnets is arranged at an outer periphery side than the center of the contact member.

8. The input device as claimed in claim 5,
wherein the plurality of first magnets is arranged at an outer periphery side than the center of the contact member.

9. The input device as claimed in claim 6,
wherein the plurality of first magnets is arranged at an outer periphery side than the center of the contact member.

10. The input device as claimed in claim 1,
wherein magnetic poles of the first magnet and the second magnet facing each other are different from each other.

11. The input device as claimed in claim 1,
wherein the contact member is supported by the housing via an elastic member.

12. The input device as claimed in claim 1,
wherein the drive device includes a motor for rotating the rotary body, and has a sensor for measuring the number of rotations of the motor, or a sensor for measuring the number of rotations of the rotary body.

13. A movable body comprising:
the input device claimed in claim 1;
a controller; and
a display,
wherein the display is provided at a position different from a position of the input device.

14. An input device comprising:
a contact member to be in contact with a contact body;
a housing for supporting the contact member in a movable manner; and
a drive device for moving the contact member with respect to the housing to change a height of a contact face of the contact member with respect to the housing,
wherein the drive device is equipped with a rotatable rotary body, one or a plurality of first magnets disposed on the rotary body, and one or a plurality of second magnets disposed on the contact member,
wherein the first magnet and the second magnet are arranged so as to be able to face each other,
wherein a position of the first magnet with respect to the second magnet is changed responsive to rotation of the rotary body, and
wherein the rotary body is a shaft arranged opposite to the contact member.

15. The input device as claimed in claim 14,
wherein a magnetic pole of the first magnet is provided on a side face around a rotating axis of the shaft.

16. An input device comprising:
a contact member to be in contact with a contact body;
a housing for supporting the contact member in a movable manner; and
a drive device for moving the contact member with respect to the housing to change a height of a contact face of the contact member with respect to the housing,
wherein the drive device is equipped with a rotatable rotary body, one or a plurality of first magnets disposed on the rotary body, and one or a plurality of second magnets disposed on the contact member,
wherein the first magnet and the second magnet are arranged so as to be able to face each other,
wherein a position of the first magnet with respect to the second magnet is changed responsive to rotation of the rotary body,
wherein the rotary body is a rotary plate arranged opposite to the contact member, and
wherein the first magnet is provided at a position away from a rotating axis of the rotary plate in a specific distance.

* * * * *